US010969306B2

(12) United States Patent
Lombardo et al.

(10) Patent No.: US 10,969,306 B2
(45) Date of Patent: Apr. 6, 2021

(54) DEVICE FOR TAKING MULTIPLE SAMPLES WHILE AVOIDING CROSS-CONTAMINATION

(71) Applicants: Seamus Lombardo, Nanuet, NY (US); Ifechukwu Ononye, Potsdam, NY (US); Cornato R Vella, Poway, CA (US); Paul Stathis, Jamesville, NY (US); Michael Esswein, Syosset, NY (US); Alexander Hathaway, Liverpool, NY (US); Asad Esa, Astoria, NY (US)

(72) Inventors: Seamus Lombardo, Nanuet, NY (US); Ifechukwu Ononye, Potsdam, NY (US); Cornato R Vella, Poway, CA (US); Paul Stathis, Jamesville, NY (US); Michael Esswein, Syosset, NY (US); Alexander Hathaway, Liverpool, NY (US); Asad Esa, Astoria, NY (US)

( * ) Notice: Subject to any disclaimer, the term of this patent is extended or adjusted under 35 U.S.C. 154(b) by 679 days.

(21) Appl. No.: 15/600,205

(22) Filed: May 19, 2017

(65) Prior Publication Data

US 2017/0336297 A1  Nov. 23, 2017

Related U.S. Application Data

(60) Provisional application No. 62/392,112, filed on May 20, 2016.

(51) Int. Cl.
*B01L 9/00* (2006.01)
*G01N 1/02* (2006.01)
*G01N 1/18* (2006.01)
*G01N 1/10* (2006.01)

(52) U.S. Cl.
CPC .............. *G01N 1/02* (2013.01); *G01N 1/18* (2013.01); *B01L 2300/045* (2013.01); *G01N 2001/027* (2013.01); *G01N 2001/1031* (2013.01)

(58) Field of Classification Search
CPC ............................ B01L 2300/043; B01L 9/50
USPC ................................................. 422/561, 560
See application file for complete search history.

(56) References Cited

U.S. PATENT DOCUMENTS

2001/0025149 A1\* 9/2001 Kobayashi ............. A61B 10/06
600/564

\* cited by examiner

*Primary Examiner* — Natalia Levkovich (74) *Attorney, Agent, or Firm* — Brian L. Wamsley; Ware, Fressola, Maguire & Barber LLP (57) ABSTRACT

A device for collecting multiple samples for use by a single user while avoiding cross-contamination under adverse conditions is disclosed. A multiple sampling device comprising a single handle actuator with a trigger, connected to a shaft assembly further connected to a claw assembly for actuating a self-sealing sampling sphere in the process of collecting a desired sample, is disclosed. The sampling sphere comprises two halves that separate when the trigger and claw assembly are actuated, and close together when the trigger is released using springs on the claw assembly and sampling sphere. Additional sampling spheres are stored on the shaft assembly. In operation, once a sample is collected by one sampling sphere, the sampling sphere is exchanged with an empty sampling sphere stored on the shaft assembly.

5 Claims, 6 Drawing Sheets

DEVICE FOR TAKING MULTIPLE SAMPLES WHILE AVOIDING CROSS-CONTAMINATION

This application claims priority from U.S. provisional application No. 62/392,112 filed May 20, 2016.

BACKGROUND

As space technologies and exploration rapidly expand, the capability will soon exist to send astronauts to asteroids, Mars, and beyond. These nearby extraterrestrial bodies are full of unexplored areas and harbor undiscovered materials with the potential to yield extraordinary benefits for science and the public. In particular, asteroids have the potential to be mined, providing scientific data on our solar system and possibility of lucrative material resources. The invention described herein is a sampling device that is designed to contribute to the goal of exploring and mining asteroids, although many other terrestrial uses are also contemplated. The sampling device is designed to enable a single user, under adverse conditions, such as an astronaut, to collect soil, rock, liquid and floating samples with relative ease.

For example, the design of the within sampling device will allow astronauts to collect multiple samples in a zero gravity environment through its use of contained sample spheres which will seal in free-floating material. The purpose of this sampling device, among other things, is to allow astronauts to collect float samples on an asteroid, or any other environment with reduced gravity. The device is designed to be very easy to operate. Astronauts have previously spacewalked when they are operating aboard the International Space Station. In this environment, it is difficult to control one's motion and any slight motion or disturbance can cause unwanted instability. A sampling device is needed that will not create any unbalancing forces or torques. The within invention satisfies this need through its design in that all motion is in a direct line from the user, and all mechanical action takes place within a vertical two-dimensional plane defined by the orientation of the components of the device. Additionally, actuating handle is oriented such the actuating motion is directly aligned with the shaft of the device, preventing the need for any large motions that might create unwanted disturbance torques. If the astronaut has to strain, he may lose equilibrium, and as a result lose control of his movements making the collection process more difficult. Accordingly, ease of operation is paramount in the design of the within sampling device.

Further, when studying completely foreign samples any cross-contamination can lead to confusion and ruined data. When testing material properties, characteristics of a certain material may be mixed with others, and the result is that the analysis of these materials will take longer or be ruled impossible. The within sampling device prevents this harmful contamination through the use of sealed, self-contained sampling spheres. These self-contained spheres are previously unknown on a handheld sampling device like the one described above.

While the goal of this invention is to provide a device for collecting samples in a zero gravity environment, with little or no atmosphere, it can also function well in other extreme environments. To confirm this performance, the invention was tested in a Neutral Buoyancy Laboratory (NBL) at NASA's Johnson Space Center, in a giant pool which "simulated" a zero gravity environment. In this test, gravity a ad a surrounding fluid were present. The sampling device of this invention performed beyond our expectations in the ease of sampling under these conditions as well as maintaining the integrity of the samples taken. This demonstration confirmed many of the device's design properties, such as the sampling spheres, the sphere tether hook, and its disturbance torque mitigation are also well suited to the underwater environment.

SUMMARY OF THE INVENTION

It is therefore an object of the present invention to provide a device for collecting multiple samples under adverse or extreme conditions while avoiding cross-contamination between samples. It is further an object of this invention to provide a multiple sampling device that is easy to use by a single user. In that regard, it is also an object of the invention to provide a multiple sampling device that is free from unbalanced forces or torques so as to reduce instability of the user.

Thus, the present invention provides a device for collecting multiple samples comprising a single handle actuator having a trigger designed to be operated by only one hand of the user. The single handle actuator is connected to a shaft assembly, which in turn is connected to a claw assembly that opens and closes a sampling sphere detachably connected to the claws of the claw assembly. The handle actuator further comprises a rod or a cord that is connected from the trigger, through the shaft assembly, to the claw assembly, such that activation of the handle actuator by pulling the trigger, retracts the rod or cord through the shaft and actuates the claw assembly to open the sampling sphere. The sampling sphere comprises two half spheres, i.e., an upper half sphere and a lower half sphere, and has a spring connected on each side to the upper and lower halves of the sampling sphere that provides tension to the two half-spheres while in an open position, and helps secure the two half spheres when closed. A latch further secures the sampling sphere when closed. When the trigger is released by the user after the sample is collected, the two springs on the sides of the sampling sphere cause the sampling sphere to close, thus securing the sample. In addition, the claw assembly also comprises a spring that provides tension on the claw assembly when the claw assembly is actuated by the handle actuator in opening the sampling sphere. The tension on the spring in the claw assembly provides further assistance in closing the sampling sphere after the handle actuator is released.

The shaft assembly of the invention further comprises multiple clips for detachably securing and storing multiple sampling spheres when not in use in sample collection. The clips also provide for convenient storage of the sampling spheres after the samples are collected and secured within the sampling sphere. The clips are designed so that the sampling spheres are easily detached and re-attached by a single user.

In addition, the operational components of the within invention are designed to be free from unbalanced forces and torque, by eliminating lateral torque or stress. That is, the actuator handle, shaft, claw assembly and sampling sphere, are configured to operate in a vertical, two-dimensional plane of operation, resulting in little or no lateral forces or stress. Even the two half-spheres of the sampling sphere separate and open in this vertical plane, and not laterally (or perpendicularly) to the plane of operation.

BRIEF DESCRIPTION OF THE DRAWINGS

The methods, features, objects, and advantages according to the invention will appear and can be further understood and described in more detail with regard to the accompanying figures. The figures illustrate ways of implementing the present invention and are not to be construed as being limiting to other possible embodiments falling within the scope of the attached claims.

DETAILED DESCRIPTION OF THE INVENTION

The preferred embodiments of the present invention will now be described with reference to the FIGS. 1-7 of the drawings. Identical elements in the various figures are designated with the same reference numerals.

Figure 1:
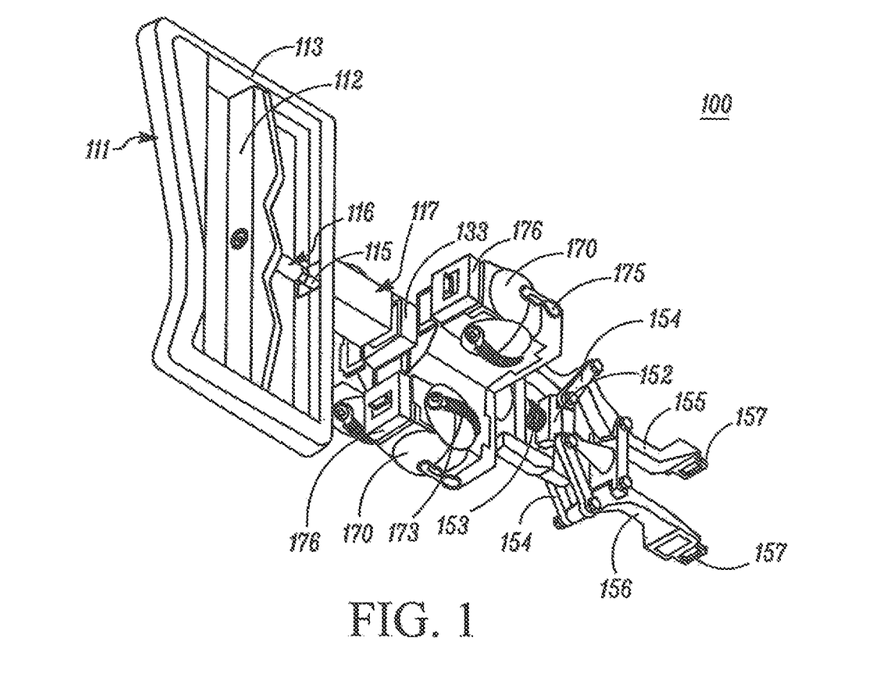
FIG. 1 is a perspective view of an embodiment of the invention, illustrating the handle assembly, shaft assembly, and claw assembly.
Figure 2:
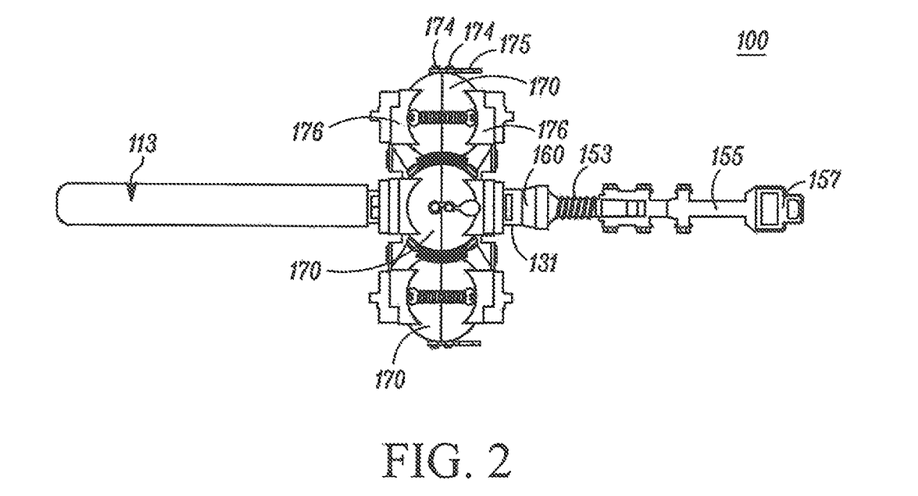
FIG. 2 is a top view of the embodiment of the device of FIG. 1.
Figure 3:
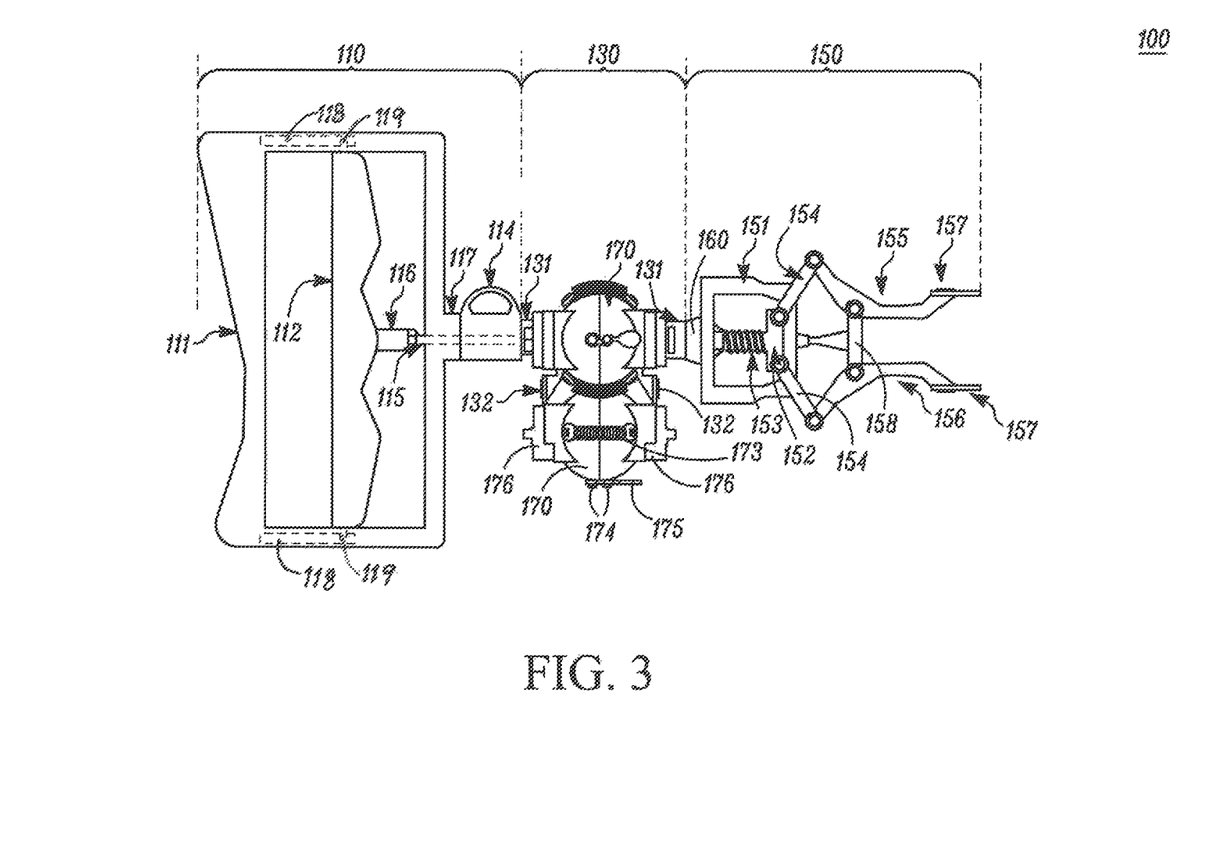
FIG. 3 is a side view of the embodiment of the device of FIG. 1.
Figure 4:
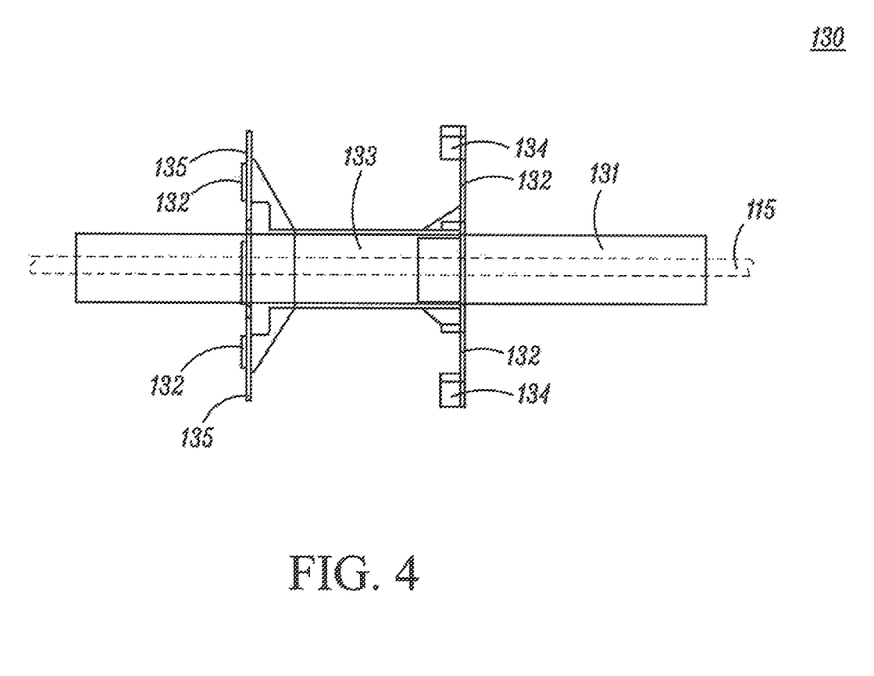
FIG. 4 is a side view of an embodiment of the shaft assembly of the device of the invention.
Figure 5:
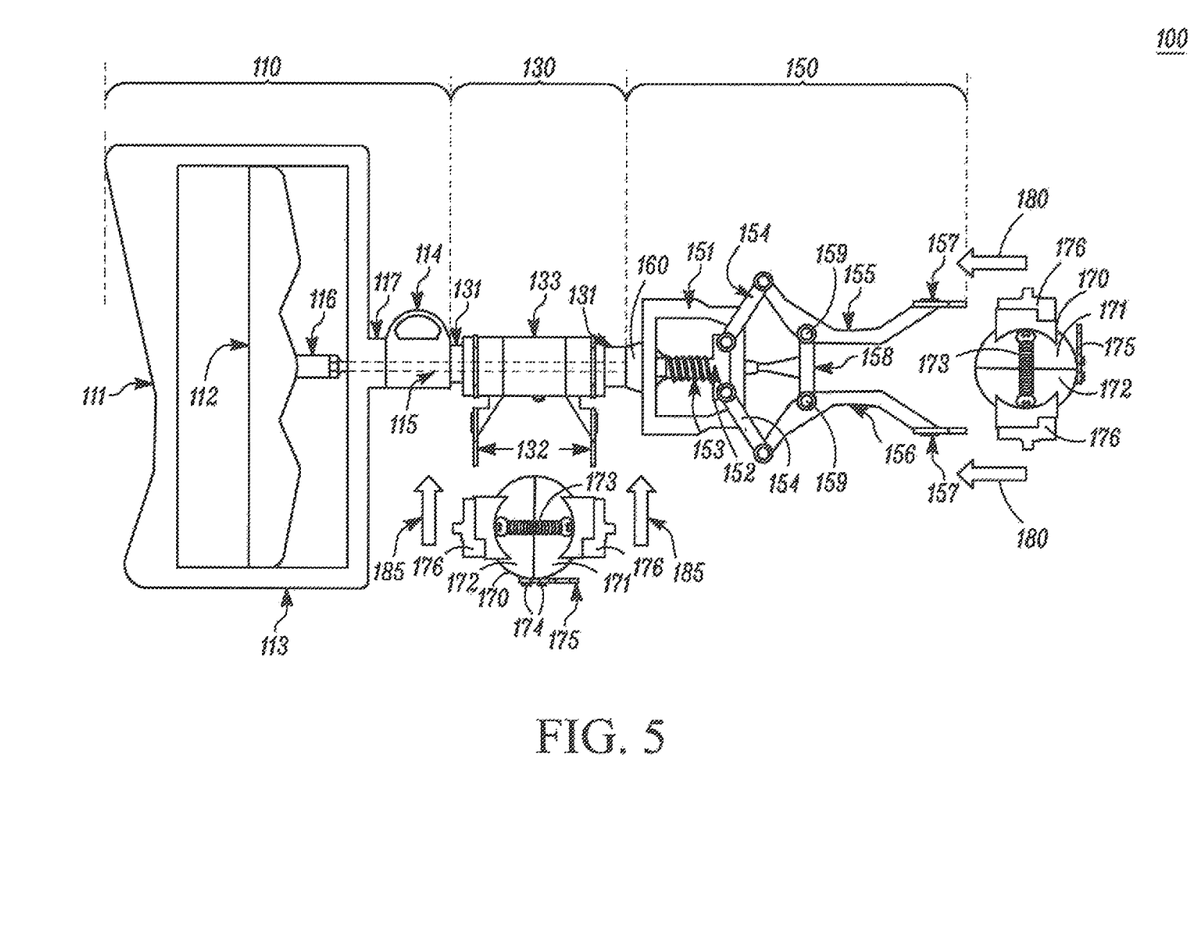
FIG. 5 is a side view of a further embodiment of the invention illustrating the attachment of sampling spheres.

Referring now to the drawings, FIGS. 1-3 show a perspective view, side view and top view of the multiple sampling device of the within invention, respectively. Multiple sampling device 100 comprises four sections, or assemblies; a handle actuator or handle assembly 110 (FIGS. 3, 5); a shaft assembly 130 (FIGS. 3-5); an operating or claw head assembly 150 (FIGS. 3, 5 and 7), and the sampling assembly, preferably a sampling sphere 170 (FIGS. 3, 5). The four assembly sections are described as follows.

Referring to FIGS. 3 and 5, a preferred embodiment of handle assembly 110 is illustrated at one end of the multiple sampling device 100. In this embodiment, handle assembly 110 comprises hand grip 111 and trigger 112, surrounded by frame 113. Frame 113 provides structure and support to hand assembly 110.

Handle assembly 110 essentially comprises 3 subcomponents; the handle right half, the handle left half (not shown) and trigger 112. The division of the handle into two halves was done for ease of assembly, but this feature could be constructed in a variety of ways. Each handle half, as well as hand grip 111, trigger 112 and frame 113 may be constructed of any appropriate and durable material, including metal, metal alloy or plastic, which may be determined at least partially by the dictates of the environment in which the device is to be used. In the initial prototype, these components were 3D printed out of PLA for ease of manufacture. The handle assembly 110 has cavities 118 to allow for the placement of both trigger 112 (FIG. 3). Handle assembly 110 further comprises D-ring 114 so that a tether can be attached as a safety feature. Trigger 112 is the other subcomponent of handle assembly 110. Trigger 112 further comprises flanges 119 protruding at its upper and lower ends. Flanges 118 are positioned inside cavities 118 and thus keep trigger 112 from escaping frame 113.

Handle assembly 110 also comprises rod 115 attached at the midpoint of trigger 112 by means of connector 116. Rod 115, preferably made of lightweight metal, passes through frame 113 at its midpoint through frame extension 117, which is hollow, into and through shaft assembly 130 and is attached to claw assembly 150. In addition, rod 115 may be replaced by a cord if so desired. Such a cord would preferably be of braided plastic fiber, such a nylon.

Shaft assembly 130 serves to provide a connection means between handle assembly 110 and claw assembly 150, as well as providing a convenient place for storing sampling spheres 170 when not in use. Referring to FIGS. 3-5, FIG. 4 illustrates shaft assembly 130, which comprises shaft 131 and shaft sleeve 133. Similar to handle assembly 110, shaft 131 and shaft sleeve 133 are constructed from lightweight, durable material that could be metal or plastic. In a preferred embodiment, shaft 131 is constructed of aluminum and is hollow, both to minimize weight and to allow passage of rod 115. Shaft 131 also is preferred to be square or rectangular in shape to minimize any slippage or rotation of sleeve 133 around shaft 131. However, shaft 131 could also comprise a round or circular shape. A pair of male clips 135 are attached to arms 132 that protrude from sleeve 133 at the flat sides of the rectangular sleeve 133, and become attachment points for the sampling spheres 170. Each sampling sphere 170 requires a pair of male clips 135. Sampling spheres themselves comprise female clips 176 that are removably attachable to male clips 135. This arrangement allows sampling spheres 170 to be secured to shaft 131 at the site of each pair of clips 135 on sleeve 133, when sampling spheres 170 are not in use on claw head assembly 150.

Figure 6:
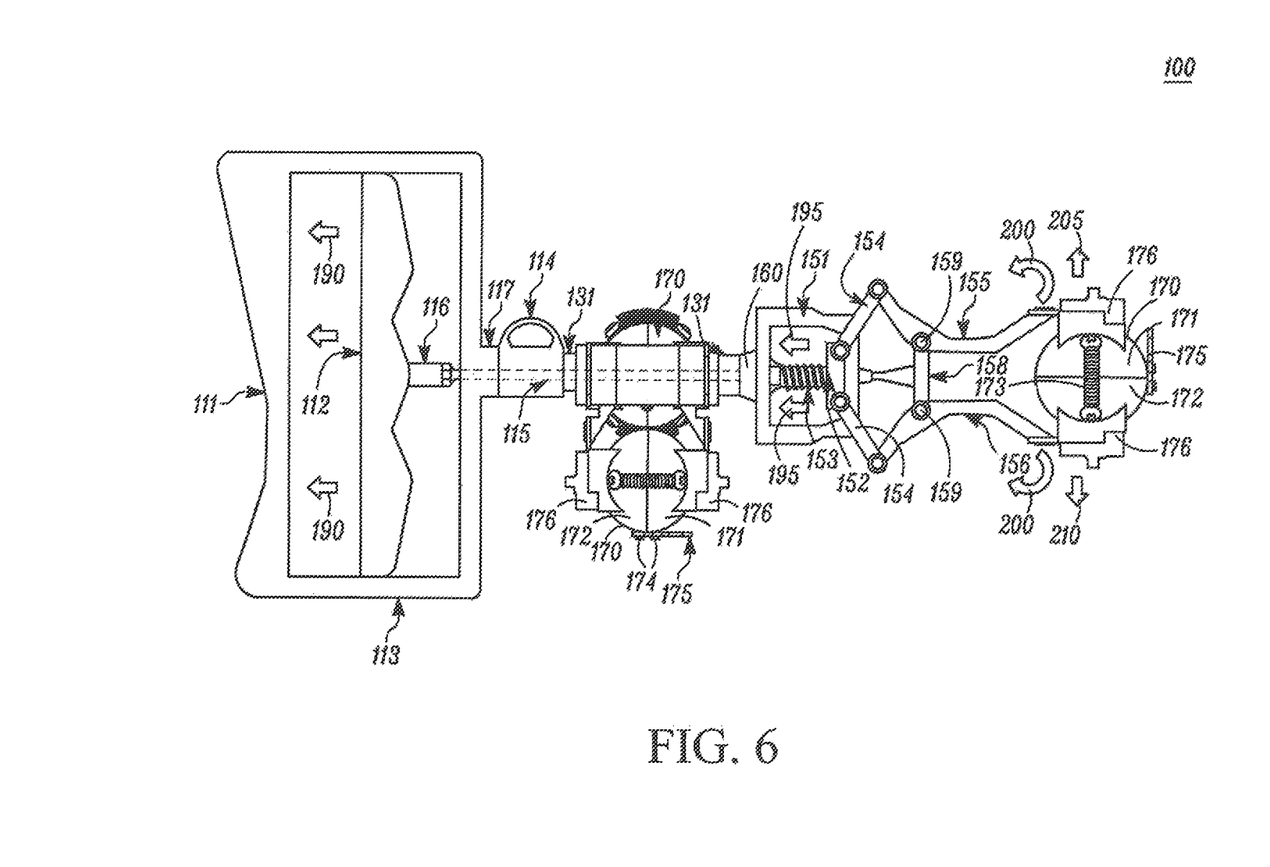
FIG. 6 is a side view of an embodiment of the sampling device of the invention, illustrating the operation of the sampling device.
Figure 7:
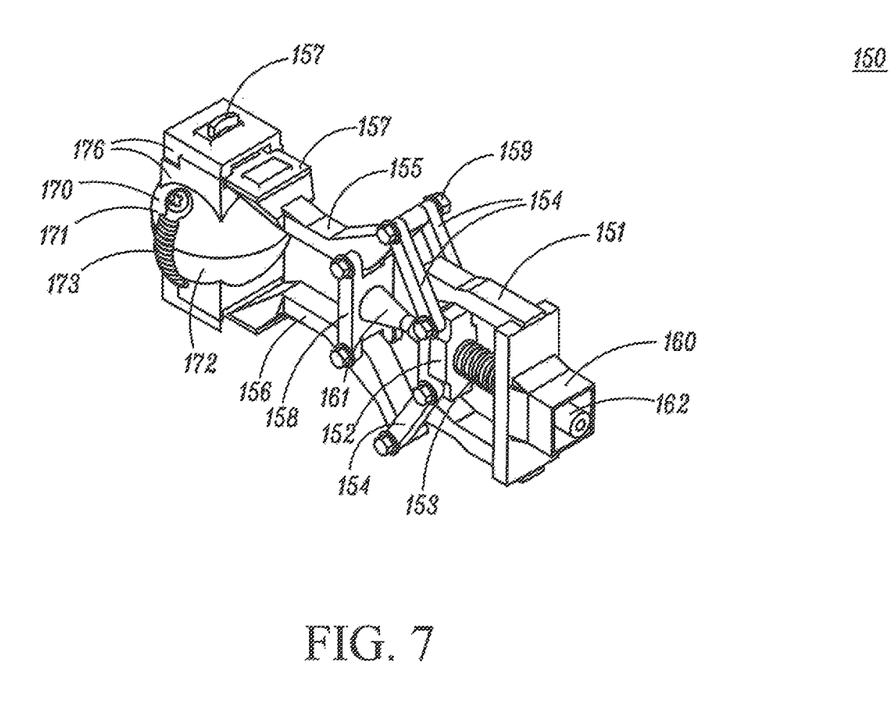
FIG. 7 is a perspective view of an embodiment of the claw head assembly of the invention.

FIGS. 3, 5 and 7 illustrate what we refer to as claw-head assembly 150. Claw-head assembly 150 is attached at the end of shaft 131 (FIG. 4) opposite handle assembly 110, and holds a sampling sphere 170 at its end opposite shaft 131. Claw-head assembly 150 is comprised of claw base 151, claw actuator 152, and claw spring 153. Claw base 151 is secured at the end of shaft 131 by collar 160, which renders claw base 151 immovable with respect to the other components of claw-head assembly 150. Claw connectors 154 movably connect upper prong 155 and lower prong 156 to claw actuator 152, which is movable within claw base 151. Sampling sphere 170 is held in place on claw-head assembly 150 by upper prong 155 and lower prong 156. Upper prong 155 and lower prong 156 each has a male clip 157 to allow the prongs to attach to sampling sphere 170 (FIGS. 6 and 7), Upper prong 155 and lower prong 156 are further connected by prong connector 158, which keeps the prongs together at a fixed distance while allowing them to pivot, when claw-head assembly 150 is actuated. Claw connectors 154, upper prong 155, lower prong 156, claw actuator 152 and prong connector 158 are movably connected by bolts 159, which could be standard hex bolts or ether similar attachment device. In addition, support 161 connects and secures claw base 152 to prong connector 158. Support 161 holds prong connector 158 stationary when claw-head assembly 150 is actuated. Rod 115 is internally attached to claw actuator 152 at connector 162. Claw base 152, claw actuator 153 and claw connectors 154 and 158 are constructed from the same materials utilized for handle assembly 110. When assembled as shown in FIG. 5, for example, pulling on trigger 112 actuates claw-head assembly 150, allowing claw-head assembly 150 to open and close. Claw-head assembly 150 is vertically positioned such that it is in the same vertical two-dimensional plane as handle assembly 110.

FIGS. 3 and 5 also provide, several illustrations of sampling sphere 170. Sampling sphere 170 comprises an upper half sphere 171 and a lower half sphere 172, each of which may be 3D printed of PLA. Other suitable materials as described herein, may also be used for constructing, the sampling spheres 170. Upper half sphere 171 and a lower half sphere 172 are attached at all times by springs 173, one spring on each side. Upper half sphere 171 has a protruding lip (not shown) around its circumference that allows it to fit more securely into lower half sphere 172. Alternatively, upper half sphere 171 or lower half sphere 172 may comprise means for forming a seal between the two half spheres, such as a thin gasket made of non-reactive material such as Teflon or a synthetic rubber. Upper half sphere 171 and lower half sphere 172 also each have small protruding shafts 174 on the front which allow latch 175 to be attached. Latch 175 secures sampling sphere 170 in a closed position after the sample is collected, and also maintains the seal between the two half spheres. Sampling sphere 170 further comprises pair of female clips 176. Female clips 176 are generally made of plastic. They are attached to the top and bottom of upper half sphere 171 and lower half sphere 172. They clip into the male clips 157 on the prongs (as well as the male clips 135 on arms 132 of sleeve 133), and are the connection between sampling spheres 170 and the rest of the device.

FIG. 5 illustrates multiple sampling device 100 showing a sampling sphere 170 being attached to prongs 155 and 156 of claw-head assembly 150, by movement in direction 180. Additional sampling spheres 170 that are not in use are attached to shaft assembly 130, by movement in direction 185 for example, where they can be quickly and easily released for replacement of the sampling sphere 170 in claw-head assembly 150. The actuation of multiple sampling device 100 by pulling trigger 112 in handle assembly 130 in the direction of the arrows 190 is shown in FIG. 6. Actuation of trigger 112 causes claw actuator 152 of claw-head assembly 150 to move in the direction of arrows 195, causing prongs 155 and 156 to open in the direction of arrows 200, which in turn causes the two half spheres to separate, upper half sphere 171 moving vertically upward in direction of arrow 205, and lower half sphere 172 moving vertically downward in direction of arrow 210, in the process of collecting a sample. Because of the design of the sampling device, only one hand is needed for this operation. When trigger 112 in handle assembly 110 is released, springs 173 connected to the two sides of the sampling sphere 170 cause upper sphere half 171 and lower sphere half 172 to close, with the sample inside.

Further operation of the sampling device is described as follows. Before initial use begins the device is configured as follows:
  A) Three sampling spheres 170 are attached to shaft 131 via clips 132; a fourth sampling sphere may also be added to shaft 131, if desired;
  B) Upper and lower prongs 155 and 156 of claw head assembly 150 are open, with no sampling sphere attached to them;
  C) Trigger 112 is not retracted and is at rest in its normal position; and
  D) The D ring 114 of the handle is tethered to the operator.

The primary operation consists of the operator removing a sampling sphere from the shaft assembly, attaching it to the claw head assembly, collecting a sample, putting the sampling sphere back on the shaft assembly, then, repeating the process attain with another sampling sphere. The steps of operation are as follows:
  1) The operator takes one sampling sphere from the shaft assembly by pulling on the female end of the clip attached to the sphere.
  2) The sampling sphere disengages and the operator guides it to the front of the claw head assembly and slides the 2 male ends of the clip on the front of the claw into the female ends of the clip on either side of the sphere.
  3) The clips click into place securing the sphere to the claw head.
  4) The operator then positions the sampling device so that the sampling sphere is near the sample they wish to take.
  5) The operator (whose hand is on the handle) then pulls the trigger, opening the sampling sphere.
  6) Once the sample is inside the sampling sphere, the operator releases the trigger, closing the sphere.
  7) The operator then closes the latch on the sampling sphere attached to the claw head, securing the sample inside.
  8) The operator then pulls on both of the female ends of the clips on the sphere and detaches the sphere from the claw head.
  9) The operator then guides the sphere back to the midshaft and slides the male ends of the clips on the midshaft into the female ends of the clip on the sphere.
  10) The sphere clicks into place, securing the sphere with the sample inside to the shaft.

This process is repeated until all 3 samples are obtained.

The preceding preferred embodiments are illustrative of the practice of the invention, it is to be understood, however, that other expedients known to those of skill in the art, or disclosed herein, may be employed without departing from the spirit of the invention or the scope of the claims.

What is claimed is:
1. A device for collecting multiple samples while avoiding cross-contamination comprising:
  a handle assembly, said handle assembly comprising a hand grip and a trigger device,
  a shaft assembly connected at a first end to said handle assembly, said shaft assembly comprising a shaft and an attachment assembly affixed to said shaft, said attachment assembly comprising at least one set of attachment clips configured for removable attachment of at least one sampling assembly;
  an actuation assembly connected at a second end of said shaft assembly opposite said handle assembly, said actuation assembly comprising a base, a spring and an actuator movable within said base, said actuator being connected to a first prong and a second prong, said first and second prongs configured for the removable attachment of a sampling assembly,
  a connection rod or cord connecting said trigger device, through said shaft assembly, with said actuation assembly,
  a first sampling assembly removably attached to said first and second prongs of said actuation assembly, said first sampling assembly comprising a first sampling device for mechanically collecting a solid or liquid sample, said sampling device comprising an upper half and a lower half that are hinged together such that said upper half and said lower half can be opened with respect to each other when said trigger device in said handle assembly is actuated, and said sampling device is closed after a sample is collected by releasing said trigger, wherein said upper half and said lower half of said sampling device are configured to form a seal when said sampling device is closed, and
  wherein said handle assembly, said actuation assembly and said first sampling assembly comprising said first sampling device, are in a two-dimensional vertical alignment with each other such that the actuation and release of said trigger device does not cause lateral torque or stress.

2. The device of claim 1, wherein said first sampling device comprises a sphere having two hemispherical halves, each hemispherical half being associated with said first or second prong of said actuation assembly.

3. The device of claim 2, further comprising a second sampling assembly comprising a second sampling device comprising a sphere, and a third sampling assembly comprising a third sampling device comprising a sphere, wherein said second and said third sampling assemblies are removably interchangeable with said first sampling assembly.

4. The device of claim 3, wherein said second sampling assembly and said third sampling assembly are removably attached to said at least one set of attachment clips of said attachment assembly.

5. The device of claim 2, wherein said closing of said first sampling device is facilitated by springs attached to the actuation assembly and the sampling sphere.

* * * * *